United States Patent
Giaume

(10) Patent No.: US 9,611,771 B2
(45) Date of Patent: Apr. 4, 2017

(54) THERMOPLASTIC COMPOSITE MUFFLER

(71) Applicant: E I DU PONT DE NEMOURS AND COMPANY, Wilmington, DE (US)

(72) Inventor: Fabrice S. J-M Giaume, Peillonnex (FR)

(73) Assignee: E I DU PONT DE NEMOURS AND COMPANY, Wilmington, DE (US)

( * ) Notice: Subject to any disclaimer, the term of this patent is extended or adjusted under 35 U.S.C. 154(b) by 0 days.

(21) Appl. No.: 14/417,240

(22) PCT Filed: Oct. 25, 2013

(86) PCT No.: PCT/US2013/066732
§ 371 (c)(1),
(2) Date: Jan. 26, 2015

(87) PCT Pub. No.: WO2014/066715
PCT Pub. Date: May 1, 2014

(65) Prior Publication Data
US 2015/0218985 A1    Aug. 6, 2015

Related U.S. Application Data

(60) Provisional application No. 61/718,030, filed on Oct. 26, 2012.

(51) Int. Cl.
*F01N 1/24* (2006.01)
*F01N 1/04* (2006.01)
(Continued)

(52) U.S. Cl.
CPC ............... *F01N 1/24* (2013.01); *B32B 5/022* (2013.01); *B32B 5/06* (2013.01); *B32B 5/26* (2013.01);
(Continued)

(58) Field of Classification Search
CPC . F01N 13/16; F01N 13/14; F01N 1/24; B32B 5/022; B32B 5/06; B32B 2260/023; B32B 2260/021; B32B 2260/046
(Continued)

(56) References Cited

U.S. PATENT DOCUMENTS 3,264,272 A * 8/1966 Rees ................. B32B 17/10743
156/332
4,187,358 A * 2/1980 Kyo ........................ C08L 33/00
524/413

(Continued)

FOREIGN PATENT DOCUMENTS

DE      EP 1424360 A1 *  6/2004 ............. C08L 67/02
WO      WO 2004111126 A1 * 12/2004 ............. C08L 67/02

OTHER PUBLICATIONS

International Search Report dated Jan. 14, 2014, in PCT/US13/66732, Filed 25 25, 2013, from which this application claims the benefit of priority under 35 USC 363.

*Primary Examiner* — Edgardo San Martin

(57) ABSTRACT

A muffler for internal combustion engines including a hollow body having an inlet opening and an outlet opening, an inlet pipe extending into the hollow body through the inlet opening an outlet pipe extending out of the hollow body through the outlet opening, wherein the hollow body is formed by a material comprising a fiber lining and a composite structure, and wherein the fiber lining partially penetrates the composite structure.

19 Claims, 5 Drawing Sheets

(51) Int. Cl.
| | |
|---|---|
| *F01N 13/16* | (2010.01) |
| *B32B 5/02* | (2006.01) |
| *B32B 5/06* | (2006.01) |
| *B32B 5/26* | (2006.01) |
| *B32B 37/04* | (2006.01) |
| *B32B 37/06* | (2006.01) |
| *B32B 37/10* | (2006.01) |
| *B32B 37/18* | (2006.01) |
| *F01N 1/00* | (2006.01) |
| *F01N 1/02* | (2006.01) |

(52) U.S. Cl.
CPC .............. *B32B 37/04* (2013.01); *B32B 37/06* (2013.01); *B32B 37/10* (2013.01); *B32B 37/18* (2013.01); *F01N 1/04* (2013.01); *F01N 13/16* (2013.01); *B32B 2250/02* (2013.01); *B32B 2250/20* (2013.01); *B32B 2260/021* (2013.01); *B32B 2260/046* (2013.01); *B32B 2305/07* (2013.01); *B32B 2305/22* (2013.01); *B32B 2307/102* (2013.01); *B32B 2307/308* (2013.01); *B32B 2309/12* (2013.01); *B32B 2597/00* (2013.01); *B32B 2605/00* (2013.01); *F01N 2310/02* (2013.01); *F01N 2510/04* (2013.01); *F01N 2530/20* (2013.01); *Y10T 29/49398* (2015.01)

(58) Field of Classification Search
USPC ........ 181/246, 252, 247, 248, 249, 290, 256
See application file for complete search history.

(56) References Cited

U.S. PATENT DOCUMENTS

| | | | | |
|---|---|---|---|---|
| 4,585,685 A * | 4/1986 | Forry | .................... | E04B 1/8409 156/62.8 |
| 4,847,140 A * | 7/1989 | Jaskowski | ................. | B32B 5/06 156/148 |
| 5,418,301 A * | 5/1995 | Hult | ........................ | C08G 63/12 525/437 |
| 6,225,404 B1 * | 5/2001 | Sorensen | ............... | C08G 81/00 525/54.1 |
| 6,296,076 B1 * | 10/2001 | Hiers | ...................... | B60R 13/08 181/286 |
| 6,497,959 B1 * | 12/2002 | Mhetar | .............. | B29C 45/0001 264/310 |
| 6,543,577 B1 * | 4/2003 | Ferreira | .................... | F01N 1/24 181/243 |
| 6,663,966 B2 * | 12/2003 | Mhetar | ............... | B29C 45/0001 264/310 |
| 6,668,972 B2 * | 12/2003 | Huff | ....................... | B60K 13/04 181/228 |
| 7,063,184 B1 * | 6/2006 | Johnson | .................... | E04B 1/86 181/210 |
| RE39,260 E * | 9/2006 | Byrd | ......................... | B32B 3/02 181/205 |
| 7,291,370 B2 * | 11/2007 | Gipson | .................... | B32B 27/12 383/109 |
| 7,325,652 B2 * | 2/2008 | Huff | ........................ | B60R 19/48 181/209 |
| 7,521,386 B2 * | 4/2009 | Wenstrup | ................. | B32B 5/26 442/381 |
| 8,298,969 B2 * | 10/2012 | Bahukudumbi | .......... | B32B 5/26 428/902 |
| 8,365,862 B2 * | 2/2013 | Coates | ..................... | B32B 5/08 181/284 |
| 8,424,636 B2 * | 4/2013 | Jones | ..................... | F01N 1/006 181/212 |
| 8,496,088 B2 * | 7/2013 | Kitchen | .................... | B32B 5/26 181/290 |
| 9,346,244 B2 * | 5/2016 | Hauber | .................... | B32B 3/04 |
| 2004/0091736 A1 | 5/2004 | DiChiara | | |
| 2004/0256175 A1 * | 12/2004 | Gnadig | ................... | B32B 3/26 181/290 |
| 2006/0105664 A1 * | 5/2006 | Zafiroglu | ................. | B32B 5/02 442/402 |
| 2007/0066176 A1 * | 3/2007 | Wenstrup | ............... | B32B 5/022 442/415 |
| 2007/0173617 A1 * | 7/2007 | Eipper | .................... | C08L 67/00 525/444 |
| 2008/0050571 A1 * | 2/2008 | Haque | ..................... | B32B 5/06 428/219 |
| 2008/0153375 A1 * | 6/2008 | Wilfong | .................... | D04H 1/54 442/415 |
| 2008/0185749 A1 * | 8/2008 | Kastner | ..................... | B32B 5/26 264/109 |
| 2010/0291821 A1 | 11/2010 | Kirchner et al. | | |
| 2010/0307863 A1 | 12/2010 | Van De Flier et al. | | |
| 2011/0136401 A1 | 6/2011 | Hanusa et al. | | |
| 2012/0325578 A1 | 12/2012 | Giaume | | |
| 2013/0327705 A1 * | 12/2013 | Clark | ................... | G10K 11/168 210/508 |
| 2015/0232044 A1 * | 8/2015 | Demo | ....................... | B60R 13/08 181/290 |
| 2016/0089853 A1 * | 3/2016 | Meure | ...................... | B32B 5/26 428/212 |

\* cited by examiner

THERMOPLASTIC COMPOSITE MUFFLER

FIELD OF THE INVENTION

The present invention relates to thermoplastic composite (TPC) mufflers or silencers, as well as their methods of manufacture,

BACKGROUND OF THE INVENTION

In spite of their many advantages, internal combustion engines emit non-negligible levels of sound when functioning, and it is desirable to reduce said level of sound which many consider disturbing.

In order to decrease the sound emission of an internal combustion engine, the engine is connected to a muffler, or silencer, that dampens the sound emission of the engine to a bearable level, and in some cases, also alters the frequency of the emitted sound.

Traditional mufflers comprise a hollow body having an inlet opening and an outlet opening, an inlet pipe extending into the hollow body through the inlet opening, and an outlet pipe extending out of the hollow body through the outlet opening.

The inlet pipe, which is normally connected to the engine, directs the pressurized combustion gas from the engine into the hollow body where it can expand and cool down before exiting the hollow body through the outlet pipe into the atmosphere.

Because of the temperature of the pressurized combustion gas, which is well in excess of 700° C., the preferred material for mufflers so far has been sheet or cast metal. However, in spite of its good heat resistance, metal has the disadvantage of being very heavy.

There is a general trend in transport vehicle manufacturing that consists in reducing the weight of the vehicles in order to reduce their fuel consumption, and most dramatic weight reductions are achieved by replacing heavy metal parts with lighter composite material.

However, such replacements become problematic when, as in the case of mufflers, the part to be replaced is continuously exposed to high temperatures which limit the choice of lighter alternative materials.

The above problems nothwithstanding, attempts in providing partly polymeric mufflers have been made and are discussed below.

U.S. Pat. No. 6,543,577(B1) describes a muffler comprising a polymeric casing made of a polyamide resin filled with glass. However, the inclusion of glass into the polyamide is not enough to give the polymeric casing the desired heat resistance, and so, it is necessary to stuff the cavity formed by the polymeric casing with loose glass wool to arrive at a functioning muffler. Adding the glass wool to the cavity requires an additional step in manufacturing and is therefore not desirable, and furthermore requires either vast quantities to fill up the cavity and thereby prevent the moving of the glass wool within the cavity, or a means of fixation to prevent the glass wool from moving within the cavity.

U.S. Pat. No. 6,668,972(B2) describes a bumper/muffler assembly having an outer shell formed by a composite material, a perforated pipe and a fibrous material such as for example a glass wool felt placed between the pipe and the shell. Again, the placement and eventual fixation of the fibrous material required additional manufacturing steps that are not desirable.

U.S. Pat. No. 7,325,652(B2) describes a muffler/exhaust pipe system having an outer shell formed by a composite material and a perforated pipe extending through the shell, and having a fibrous material, such as a needle felt, placed between the pipe and the shell.

There is therefore a need to provide for a muffler, or silencer, that is lighter than existing mufflers and which can be manufactured in a more efficient manner, while at the same providing excellent heat stability properties.

SUMMARY OF THE INVENTION

The present invention, in order to solve the above-mentioned problems, provides for a muffler for internal combustion engines comprising a muffler for internal combustion engines comprising a hollow body having an inlet opening and an outlet opening, an inlet pipe extending into the hollow body through the inlet opening an outlet pipe extending out of the hollow body through the outlet opening, wherein the hollow body is formed by a material comprising a fiber lining and a composite structure, and wherein the fiber lining partially penetrates the composite structure.

DETAILED DESCRIPTION

Figure 1:
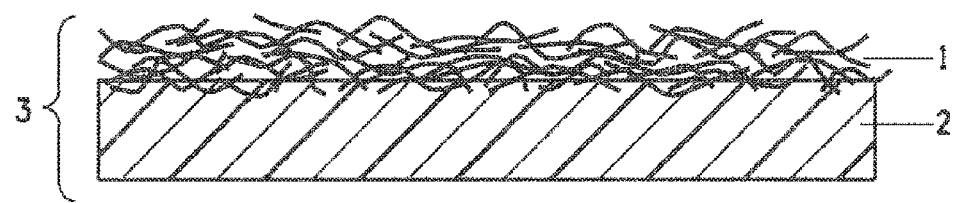
FIG. 1 shows a cross-section of the material (3) that forms the hollow body of a muffler. The material (3) is made of a non-woven fiber lining (1) that partially penetrates into the composite structure (2) and is thereby anchored to said composite structure (2).
Figure 2:
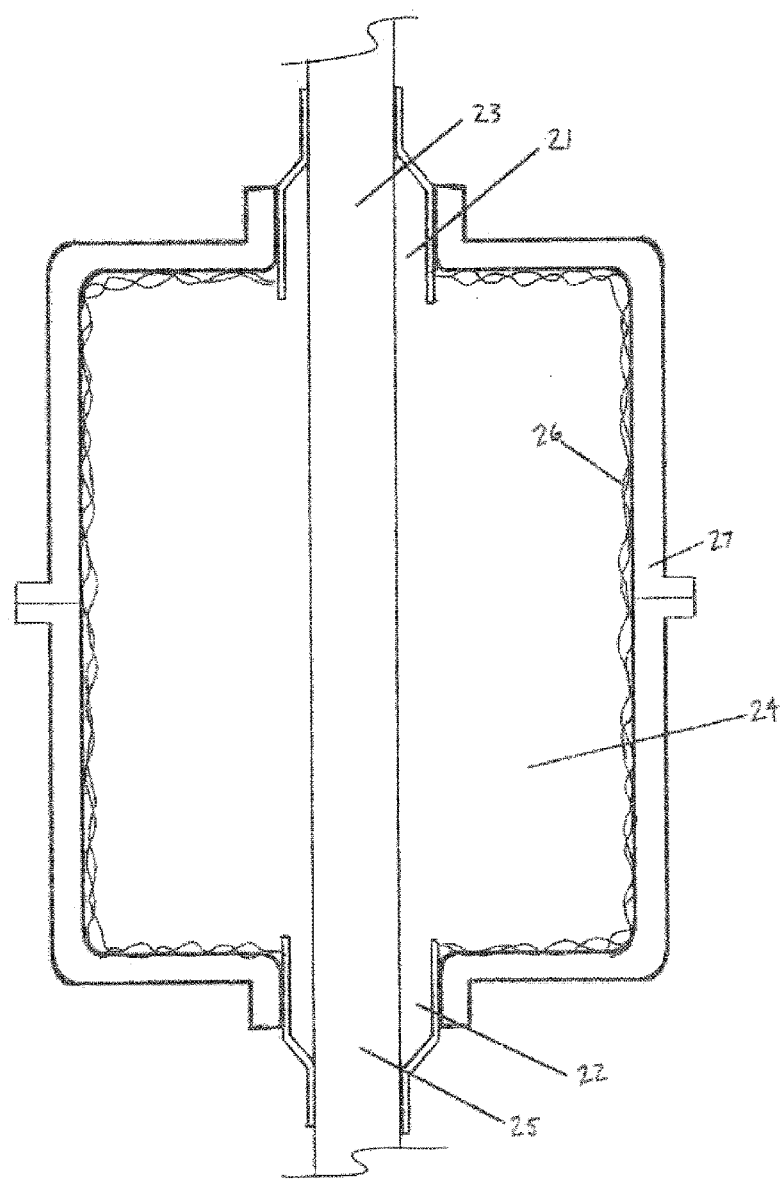
FIG. 2 shows a cross-section of a muffler comprising the various elements of the muffler assembly.

FIG. 2 shows a cross-section of a muffler comprising an inlet opening (21) and an outlet opening (22). An inlet pipe (23) extends into the hollow body (24) through the inlet opening and an outlet pipe (25) extends out the hollow body through the outlet opening. The fiber lining (26) and composite structure (27) of the hollow body are also shown.

Figure 3:
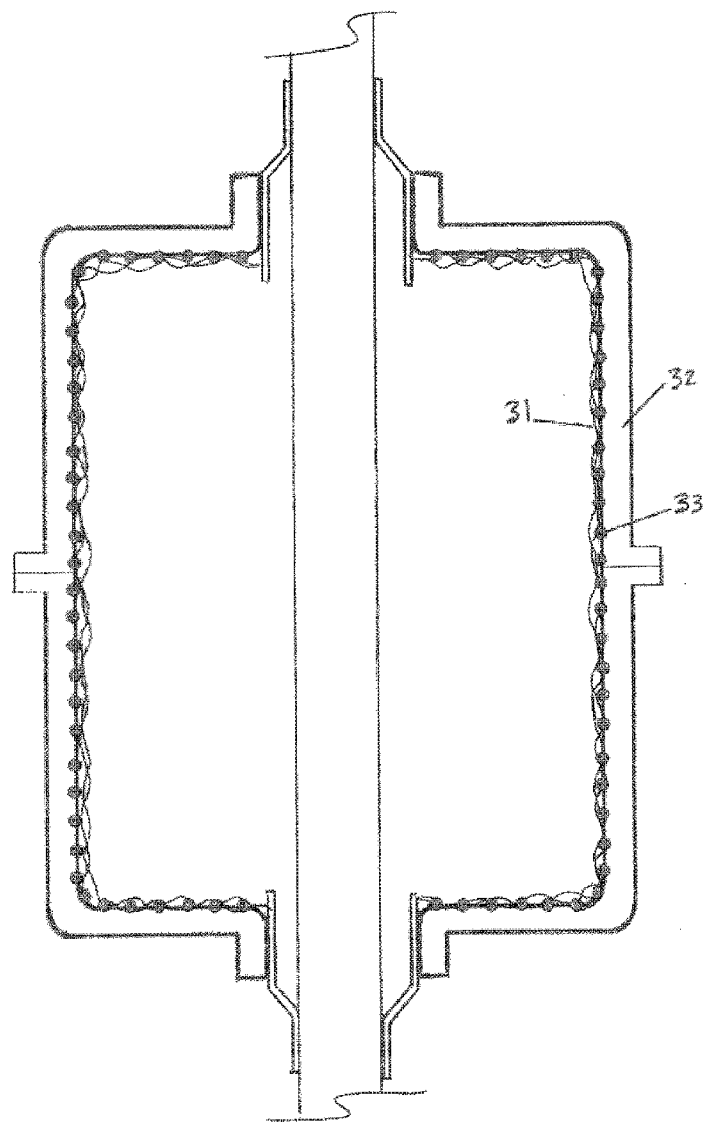
FIG. 3 shows a cross-section of a muffler comprising a heat-resistant yarn.

FIG. 3 shows a cross-section of a muffler comprising a fiber lining (31) fixed to the composite structure (32) by a heat-resistant yarn (33).

Figure 4:
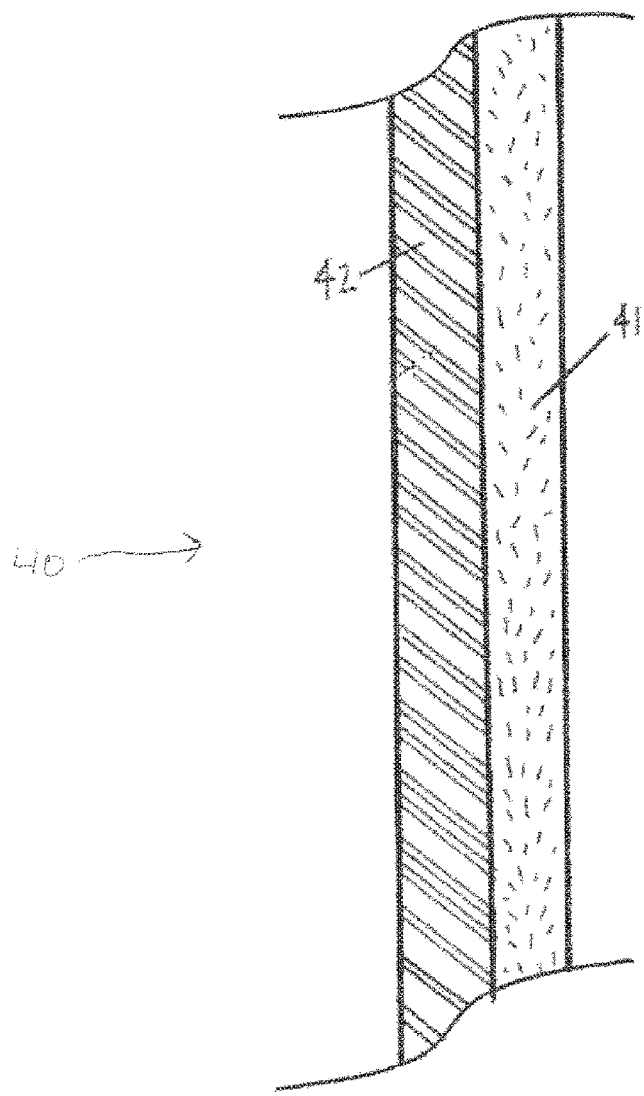
FIG. 4 shows an expanded view of the composite structure of the muffler assembly.

FIG. 4 shows an expanded view of the composite structure (40) comprising a surface resin composition (42) and a core comprising a fibrous material (41) impregnated with a matrix resin composition.

Figure 5:
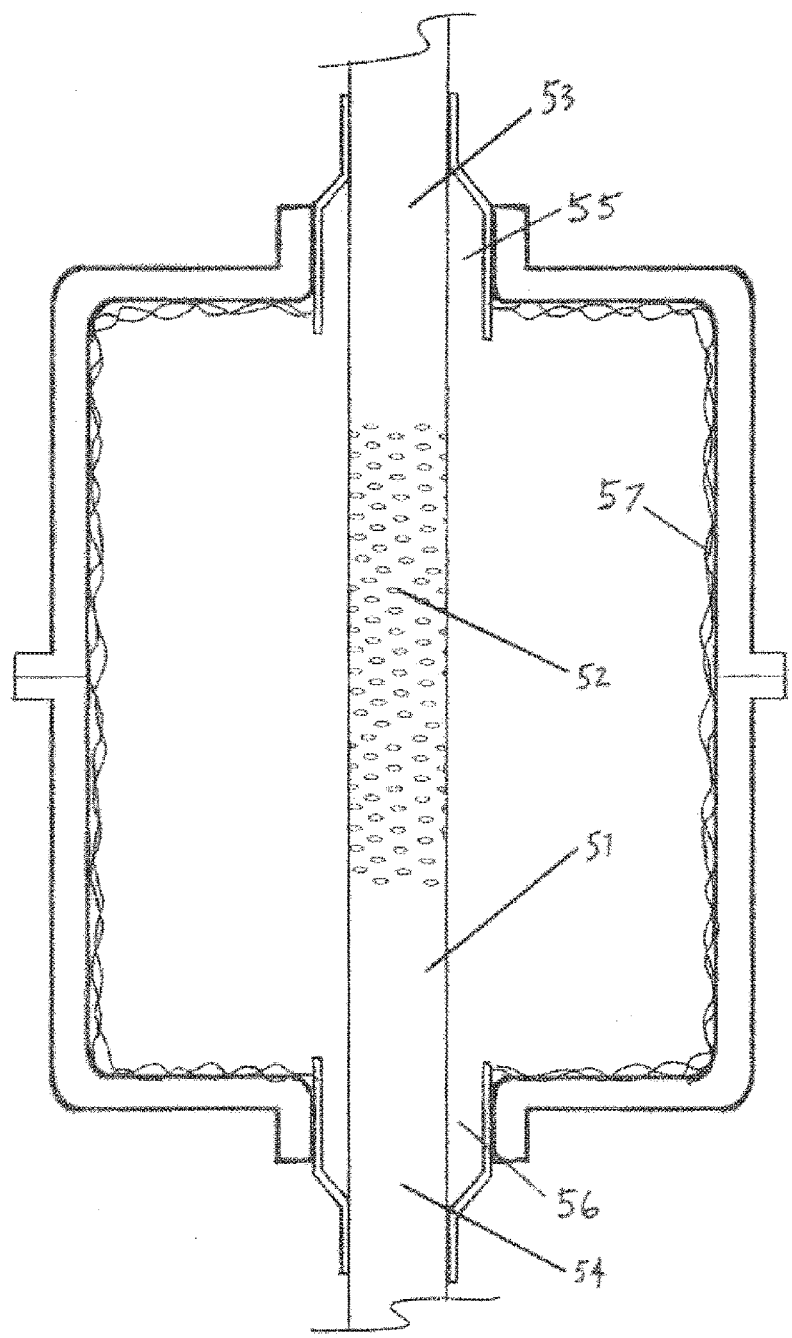
FIG. 5 shows a cross-section of a muffler comprising a tubular element having lateral perforations.

FIG. 5 shows a cross-section of a muffler comprising a tubular element having lateral perforations (52), an inlet opening (55), an outlet opening (56), an inlet pipe (53) that extends into the hollow body through the inlet opening and an outlet pipe (51) extends out the hollow body through the outlet opening. The tubular element connects the inlet pipe and outlet pipe. Fiber lining (57) is also shown.

The muffler, or silencer, described in the present invention allows to further reduce the overall weight of the engine system comprising the engine and muffler, and further displays excellent resistance against combustion gases exiting the engine.

The muffler, or silencer, described in the present invention is suitable for use with any type of internal combustion engine, and leads to a reduction in emitted sound and vibration. Exemplary internal combustion engines are two-stroke, four-stroke, Diesel or Wankel engines.

The muffler for internal combustion engines of the present invention comprises a hollow body having an inlet opening and an outlet opening, an inlet pipe extending into the hollow body through the inlet opening an outlet pipe extending out of the hollow body through the outlet opening, wherein the hollow body is formed by a material comprising a fiber lining and a composite structure, and wherein the fiber lining partially penetrates the composite structure The hollow body having an inlet opening and an outlet opening comprised in the muffler according to the present invention may have any desirable shape such as for example rectangular, spherical, oval, ellipsoid, conical, cylindrical or more complex shapes.

The hollow body is formed by a material comprising a fiber lining and a composite structure, wherein the fiber lining partially penetrates the composite structure.

The fiber lining comprised in the material forming the hollow body of the muffler or silencer may have an areal density of from 200 to 4000 grams per square meter, and preferably of from 300 to 3000 grams per square meter.

The fiber lining comprised in the material forming the hollow body of the muffler or silencer may have a thickness of from 3 to 90 millimeters, and preferably of from 5 to 50 millimeters.

The fiber lining may comprise any suitable fibrous material or a mixture of fibrous materials provided that they withstand the processing conditions used during the manufacture of the muffler and withstand exposure to combustion gases exiting the engine.

The fibrous material comprised in the fiber lining may be chosen from mineral fibers such as for example glass fibers, basalt fibers, asbestos fibers, graphite fibers, carbon fibers and ceramic fibers; synthetic fibers such as for example aramid fibers; metal fibers; and/or combinations thereof. Preferably, the fibrous material is chosen from mineral fibers or mixtures thereof and is most preferably chosen from glass fibers or asbestos fibers.

The fibrous material of the fiber lining is preferably present in the form of a non-woven structure, textile or combinations thereof, and more preferably is present as a non-woven structure.

Textiles can be selected from the group consisting of woven forms, knits, braids and combinations thereof.

Non-woven structures can be selected from random fiber orientation or aligned fibrous structures. Examples of random fiber orientation include without limitation chopped and continuous material which can be in the form of a mat, a needled mat or a felt. Examples of aligned fibrous structures include without limitation unidirectional fiber strands, bidirectional strands, multidirectional strands, multi-axial textiles.

In a preferred embodiment, the fibrous material of the fiber lining is present in the form of a reinforced non-woven structure, such as for example a needled mat or felt reinforced with a textile.

A reinforced non-woven structure comprises at least one layer of non-woven structure and at least one layer of textile, wherein the at least one layer of non-woven structure and at least one layer of textile are interlaced between them. Such materials are further known as reinforced felts, and may be obtained for example by needle-felting at least one layer of fibrous material batting or non-woven structure with at least one layer of textile.

The term "the fiber lining partially penetrates the composite structure" refers to a fiber lining of which only a part of its thickness penetrates the composite structure, i.e. only part of the overall thickness of the fiber lining is anchored in, and wetted by, at least the surface resin composition of the composite structure whereas the remaining part of the fiber lining is not in direct contact with the composite structure, i.e. "sticks out" of the composite structure.

The degree of penetration of the fiber lining into the composite structure may be of from 0.5 to 50 percent, based on the overall thickness of the lining. This means that 0.5 to 50 percent of the overall thickness of the lining is anchored in, and wetted by, at least the surface resin of the composite structure whereas the remaining 50 to 99.5 percent of the overall thickness of the fiber lining are not. Preferably, the degree of penetration of the fiber lining may range of from 0.5 to 25 percent or from 1 to 15 percent, and is most preferably of from 1 to 5 percent.

In a preferred embodiment, the fiber lining comprised in the material forming the hollow body of the silencer or muffler is further affixed to the composite structure by appropriate fixing means, such as for example rivets, pins, staples, screws or yarn. Preferably, the fixing means is a yarn.

In the case the fixing means is a yarn, the fiber lining is sewn to the composite structure using a heat-resistant yarn, that is preferably made of aramid fiber, glass fiber, asbestos fiber, metal fiber or combinations thereof.

The partial penetration of the fiber lining can be obtained in a process described in a subsequent part of the present description.

The composite structure partially penetrated by the fiber lining comprises a surface having at least a portion thereof made of a surface resin composition and a core comprising a fibrous material impregnated with a matrix resin composition, wherein the surface resin composition and the matrix resin composition are polyamide compositions comprising one or more polyamide resins.

Preferably, the one or more polyamide resins are selected from fully aliphatic and semi-aromatic polyamide resins, or mixtures thereof.

The one or more polyamide resins comprised in the surface resin composition and the matrix resin composition may be identical or different.

Polyamide resins are condensation products of one or more dicarboxylic acids and one or more diamines, and/or one or more aminocarboxylic acids, and/or ring-opening polymerization products of one or more cyclic lactams.

Semi-aromatic polyamide resins are homopolymers, copolymers, terpolymers, or higher polymers wherein at least a portion of the acid monomers are selected from one or more aromatic carboxylic acids. The one or more aromatic carboxylic acids can be terephthalic acid or mixtures of terephthalic acid and one or more other carboxylic acids, like isophthalic acid, substituted phthalic acid such as for example 2-methylterephthalic acid and unsubstituted or substituted isomers of naphthalene dicarboxylic acid, wherein the carboxylic acid component preferably contains at least 55 mole-% of terephthalic acid (the mole-% being based on the carboxylic acid mixture). Preferably, the one or more aromatic carboxylic acids are selected from the group consisting of terephthalic acid, isophthalic acid and mixtures thereof and more preferably, the one or more carboxylic acids are mixtures of terephthalic acid and isophthalic acid, wherein the mixture preferably contains at least 55 mole-% of terephthalic acid. Furthermore, the one or more carboxylic acids can be mixed with one or more aliphatic carboxylic acids, like adipic acid; pimelic acid; suberic acid; azelaic acid; sebacic acid and dodecanedioic acid, adipic acid being preferred. More preferably the mixture of terephthalic acid and adipic acid comprised in the one or more carboxylic acids mixtures of the semi-aromatic polyamide resin contains at least 25 mole-% of terephthalic acid. Semi-aromatic polyamide resins comprise one or more diamines that can be chosen among diamines having four or more carbon atoms, including, but not limited to tetramethylene diamine, hexamethylene diamine, octamethylene diamine, nonamethylene diamine, decamethylene diamine, 2-methylpentamethylene diamine, 2-ethyltetramethylene diamine, 2-methyloctamethylene diamine; trimethylhexamethylene diamine, bis(p-aminocyclohexyl)methane; m-xylylene diamine; p-xylylene diamine and/or mixtures thereof. Suitable examples of semi-aromatic polyamide resins include poly(hexamethylene terephthalamide) (polyamide 6,T), poly(nonamethylene terephthalamide) (polyamide 9,T), poly(decamethylene terephthalamide) (polyamide 10,T), poly(dodecamethylene terephthalamide) (polyamide 12,T), hexamethylene adipamide/hexamethylene terephthalamide copolyamide (polyamide 6,T/6,6), hexamethylene terephthalamide/hexamethylene isophthalamide (6,T/6,I), poly(m-xylylene adipamide) (polyamide MXD,6), hexamethylene adipamide/hexamethylene terephthalamide copolyamide (polyamide 6,T/6,6), hexamethylene terephthalamide/2-methylpentamethylene terephthalamide copolyamide (polyamide 6,T/D,T), hexamethylene adipamide/hexamethylene terephthalamide/hexamethylene isophthalamide copolyamide (polyamide 6,6/6,T/6,I); poly (caprolactam-hexamethylene terephthalamide) (polyamide 6/6,T) and copolymers and blends of the same. Preferred examples of semi-aromatic polyamide resins comprised in the polyamide composition described herein include PA6,T; PA6,T/6,6, PA6,T/6,I; PAMXD,6; PA6,T/D,T and copolymers and blends of the same.

The term "semi-aromatic" describes polyamide resins that comprise at least some aromatic carboxylic acid monomer(s) and aliphatic diamine monomer(s), in comparison with "fully aliphatic" which describes polyamide resins comprising aliphatic carboxylic acid monomer(s) and aliphatic diamine monomer(s).

Fully aliphatic polyamide resins are formed from aliphatic and alicyclic monomers such as diamines, dicarboxylic acids, lactams, aminocarboxylic acids, and their reactive equivalents. A suitable aminocarboxylic acid includes 11-aminododecanoic acid. In the context of this invention, the term "fully aliphatic polyamide resin" also refers to copolymers derived from two or more such monomers and blends of two or more fully aliphatic polyamide resins. Linear, branched, and cyclic monomers may be used.

Carboxylic acid monomers comprised in fully aliphatic polyamide resins include, but are not limited to, aliphatic carboxylic acids, such as for example adipic acid (C6), pimelic acid (C7), suberic acid (C8), azelaic acid (C9), sebacic acid (C10), dodecanedioic acid (C12) and tetradecanedioic acid (C14). Diamines can be chosen among diamines having four or more carbon atoms, including, but not limited to tetramethylene diamine, hexamethylene diamine, octamethylene diamine, decamethylene diamine, 2-methylpentamethylene diamine, 2-ethyltetramethylene diamine, 2-methyloctamethylene diamine; trimethylhexamethylene diamine and/or mixtures thereof. Suitable examples of fully aliphatic polyamide resins include PA6; PA6,6; PA4,6; PA6,10; PA6,12; PA6,14; P 6,13; PA 6,15; PA6,16; PA11; PA 12; PA10; PA 9,12; PA9,13; PA9,14; PA9,15; P 6,16; PA9,36; PA10,10; PA10,12; PA10,13; PA10,14; PA12, 10; PA12,12; PA12,13; 12,14 and copolymers and blends of the same. Preferred examples of fully aliphatic polyamide resins include PA6, PA11, PA12, PA4,6, PA6,6, PA,10; PA6,12; PA10,10 and copolymers and blends of the same. The surface resin composition and/or the matrix resin composition may further comprise one or more impact modifiers, one or more heat stabilizers, one or more oxidative stabilizers, one or more reinforcing agents, one or more ultraviolet light stabilizers, one or more flame retardant agents or mixtures thereof.

Preferred impact modifiers include those typically used for polyamide compositions, including carboxyl-substituted polyolefins, ionomers and/or mixtures thereof. Carboxyl-substituted polyolefins are polyolefins that have carboxylic moieties attached thereto, either on the polyolefin backbone itself or on side chains. By "carboxylic moieties" it is meant carboxylic groups such as one or more of dicarboxylic acids, diesters, dicarboxylic monoesters, acid anhydrides, and monocarboxylic acids and esters. Useful impact modifiers include dicarboxyl-substituted polyolefins, which are polyolefins that have dicarboxylic moieties attached thereto, either on the polyolefin backbone itself or on side chains. By "dicarboxylic moiety" it is meant dicarboxylic groups such as one or more of dicarboxylic acids, diesters, dicarboxylic monoesters, and acid anhydrides. The impact modifier may be based on an ethylene/alpha-olefin polyolefin such as for example ethylene/octene. Diene monomers such as 1,4-butadiene; 1,4-hexadiene; or dicyclopentadiene may optionally be used in the preparation of the polyolefin. Preferred polyolefins include ethylene-propylene-diene (EPDM) and styrene-ethylene-butadiene-styrene (SEBS) polymers. More preferred polyolefins include ethylene-propylene-diene (EPDM), wherein the term "EPDM" means a terpolymer of ethylene, an alpha olefin having from three to ten carbon atoms, and a copolymerizable non-conjugated diene such as 5-ethylidene-2-norbornene, dicyclopentadiene, 1,4-hexadiene, and the like. As will be understood by those skilled in the art, the impact modifier may or may not have one or more carboxyl moieties attached thereto. The carboxyl moiety may be introduced during the preparation of the polyolefin by copolymerizing with an unsaturated carboxyl-containing monomer. Preferred is a copolymer of ethylene and maleic anhydride monoethyl ester. The carboxyl moiety may also be introduced by grafting the polyolefin with an unsaturated compound containing a carboxyl moiety, such as an acid, ester, diacid, diester, acid ester, or anhydride. A preferred grafting agent is maleic anhydride. Blends of polyolefins, such as polyethylene, polypropylene, and EPDM polymers with polyolefins that have been grafted with an unsaturated compound containing a carboxyl moiety may be used as an impact modifier. The impact modifier may be based on ionomers. By "ionomer", it is meant a carboxyl group containing polymer that has been neutralized or partially neutralized with metal cations such as zinc, sodium, or lithium and the like. Examples of ionomers are described in U.S. Pat. Nos. 3,264,272 and 4,187,358. Examples of suitable carboxyl group containing polymers include, but are not limited to, ethylene/acrylic acid copolymers and ethylene/methacrylic acid copolymers. The carboxyl group containing polymers may also be derived from one or more additional monomers, such as, but not limited to, butyl acrylate. Zinc salts are preferred neutralizing agents. Ionomers are commercially available under the trademark Surlyn® from E.I. du Pont de Nemours and Co., Wilmington, Del. When present, the one ore more impact modifiers comprise up to at or about 30 wt-%, or preferably from at or about 3 to at or about 25 wt-%, or more preferably from at or about 5 to at or about 20 wt-%, the weight percentage being based on the total weight of the surface resin composition or the matrix resin composition, as the case may be.

The surface resin composition and/or the matrix resin composition may further comprise one or more heat stabilizers. The one or more heat stabilizers are preferably selected from the group consisting of copper salts and/or derivatives thereof, hindered amine antioxidants, phosphorus antioxidants and mixtures thereof and more preferably from copper salts and/or derivatives combined with a halide compound, from hindered phenol antioxidants, hindered amine antioxidants, phosphorus antioxidants and mixtures thereof. Examples of copper salts and/or derivatives thereof include without limitation copper halides or copper acetates; divalent manganese salts and/or derivatives thereof and mixtures thereof. Preferably, copper salts and/or derivatives are used in combination with halide compounds and/or phosphorus compounds and more preferably copper salts are used in combination with iodide or bromide compounds, and still more preferably, with potassium iodide or potassium bromide. When present, the one or more heat stabilizers are present in an amount from at or about 0.1 to at or about 3 wt-%, or preferably from at or about 0.1 to at or about 1 wt-%, or more preferably from at or about 0.1 to at or about 0.7 wt-%, the weight percentage being based on the total weight of the surface resin composition or the matrix resin composition, as the case may be. The addition of the one or more heat stabilizers further improves the thermal stability of the composite structure during its manufacture (i.e. a decreased molecular weight reduction is obtained) as well as its thermal stability upon use and time. In addition to the improved heat stability, the presence of the one or more heat stabilizers may allow an increase of the temperature that is used during the impregnation of the composite structure, thus reducing the melt viscosity of the matrix resin and/or the polyamide composition described herein. As a consequence of a reduced melt viscosity of the matrix resin and/or the polyamide surface resin composition, impregnation rate may be increased.

The surface resin composition and/or the matrix resin composition may further contain one or more oxidative stabilizers such as for example phosphorus antioxidants (e.g. phosphite or phosphonite stabilizers), hindered phenol stabilizers, aromatic amine stabilizers, thioesters, and phenolic based anti-oxidants that hinder thermally induced oxidation of polymers where high temperature applications are used. When present, the one or more oxidative stabilizers comprise from at or about 0.1 to at or about 3 wt-%, or preferably from at or about 0.1 to at or about 1 wt-%, or more preferably from at or about 0.1 to at or about 0.7 wt-%, the weight percentage being based on the total weight of the surface resin composition or the matrix resin composition, as the case may be.

The surface resin composition and/or the matrix resin composition may further contain one or more reinforcing agents such as glass fibers, glass flakes, carbon fibers, mica, wollastonite, calcium carbonate, talc, calcined clay, kaolin, magnesium sulfate, magnesium silicate, barium sulfate, titanium dioxide, sodium aluminum carbonate, barium ferrite, and potassium titanate. When present, the one or more reinforcing agents are present in an amount from at or about 1 to at or about 60 wt-%, preferably from at or about 1 to at or about 40 wt-%, or more preferably from at or about 1 to at or about 35 wt-%, the weight percentages being based on the total weight of the surface resin composition or the matrix resin composition, as the case may be.

The surface resin composition and/or the matrix resin composition may further contain one or more ultraviolet light stabilizers such as hindered amine light stabilizers (HALS), carbon black, substituted resorcinols, salicylates, benzotriazoles, and benzophenones.

The surface resin composition and/or the matrix resin composition may further contain one or more flame retardant agents such as metal oxides (wherein the metal may be aluminum, iron, titanium, manganese, magnesium, zirconium, zinc, molybdenum, cobalt, bismuth, chromium, tin, antimony, nickel, copper and tungsten), metal powders (wherein the metal may be aluminum, iron, titanium, manganese, zinc, molybdenum, cobalt, bismuth, chromium, tin, antimony, nickel, copper and tungsten), metal salts such as zinc borate, zinc metaborate, barium metaborate, zinc carbonate, magnesium carbonate, calcium carbonate and barium carbonate, metal phosphinates (wherein the metal may be aluminum, zinc and calcium), halogenated organic compounds like decabromodiphenyl ether, halogenated polymer such as poly(bromostyrene) and brominated polystyrene, melamine pyrophosphate, melamine cyanurate, melamine polyphosphate, red phosphorus, and the like.

With the aim of further reducing the melt viscosity of the matrix resin composition, the matrix resin composition described herein may further comprise one or more rheology modifiers selected from the group consisting of hyperbranched polymers (also known as dendritic or highly branched polymers, dendritic macromolecules or arborescent polymers), molecular chain breaking agents and mixtures thereof. Hyperbranched polymers are three dimensional highly branched molecules having a treelike structure. Hyperbranched polymers are macromolecules that comprise one or more branching comonomer units. The branching units comprise branching layers and optionally a nucleus (also known as core), one or more spacing layers and/or a layer of chain terminating molecules. Continued replication of the branching layers yields increased branch multiplicity, branch density, and an increased number of terminal functional groups compared to other molecules. Preferred hyperbranched polymers include hyperbranched polyesters. Preferred examples of hyperbranched polymers are those described in U.S. Pat. No. 5,418,301 US 2007/0173617. The use of such hyperbranched polymers in thermoplastic resins is disclosed in U.S. Pat. No. 6,225,404, U.S. Pat. No. 6,497,959, U.S. Pat. No. 6,663,966, WO 2003/004546, EP 1424360 and WO 2004/111126. This literature teaches that the addition of hyperbranched polymeric polyester macromolecules to thermoplastic compositions leads to improved rheological and mechanical properties due to the reduction of the melt viscosity of the composition and, therefore, leads to an improved processability of the thermoplastic composition. When present, the one or more hyperbranched polymers comprise from at or about 0.05 to at or about 10 wt-%, or more preferably from at or about 0.1 to at or about 5 wt-%, the weight percentage being based on the total weight of the matrix resin composition. Examples of molecular chain breaking agents include without limitation aliphatic dicarboxylic acids and aromatic dicarboxylic acids. Specific examples thereof are oxalic acid, malonic acid, succinic acid, adipic acid, azelaic acid, sebacic acid, dodecanedioic acid and isomers of phthalic acid. When present, the one or more molecular chain breaking agents comprise from at or about 0.05 to at or about 5 wt-%, or more preferably from at or about 0.1 to at or about 3 wt-%, the weight percentage being based on the total weight of the matrix resin composition.

The surface resin composition and/or the matrix resin composition may further include modifiers and other ingredients, including, without limitation, flow enhancing additives, lubricants, antistatic agents, coloring agents (including dyes, pigments, carbon black, and the like), flame retardants, nucleating agents, crystallization promoting agents and other processing aids known in the polymer compounding art.

Fillers, modifiers and other ingredients described above may be present in amounts and in forms well known in the art, including in the form of so-called nano-materials where at least one of the dimensions of the particles is in the range of 1 to 1000 nm.

Preferably, the surface resin composition and/or the matrix resin composition are melt-mixed blends, wherein all of the polymeric components are well-dispersed within each other and all of the non-polymeric ingredients are well-dispersed in and bound by the polymer matrix, such that the blend forms a unified whole. Any melt-mixing method may be used to combine the polymeric components and non-polymeric ingredients of the present invention. For example, the polymeric components and non-polymeric ingredients may be added to a melt mixer, such as, for example, a single or twin-screw extruder; a blender; a single or twin-screw kneader; or a Banbury mixer, either all at once through a single step addition, or in a stepwise fashion, and then melt-mixed. When adding the polymeric components and non-polymeric ingredients in a stepwise fashion, part of the polymeric components and/or non-polymeric ingredients are first added and melt-mixed with the remaining polymeric components and non-polymeric ingredients being subsequently added and further melt-mixed until a well-mixed composition is obtained.

The composite structure comprised in the material forming the hollow body of the muffler according to the present invention comprises a surface having at least a portion thereof made of a surface resin composition and a core comprising a fibrous material impregnated with a matrix resin composition.

The composite structure comprised in the material forming the hollow body of the muffler according to the present invention may be obtained by a process comprising the steps of i) impregnating a fibrous material with the matrix resin composition, wherein at least a portion of the surface of the composite structure is made of the surface resin composition.

As used herein, the term "impregnating a fibrous material with the matrix resin composition" means that the matrix resin composition encapsulates and embeds the fibrous material so as to form an interpenetrating network of fibrous material substantially surrounded by the matrix resin composition.

The fibrous material comprises fibers having cross section that can be any shape, but is typically round. The fibrous material may be in any suitable form known to those skilled in the art and is preferably selected from the group consisting of non-woven structures, textiles, fibrous battings and combinations thereof.

Non-woven structures can be selected from random fiber orientation or aligned fibrous structures. Examples of random fiber orientation include without limitation chopped and continuous material which can be in the form of a mat, a needled mat or a felt. Examples of aligned fibrous structures include without limitation unidirectional fiber strands, bidirectional strands, multidirectional strands, multi-axial textiles.

Textiles can be selected from the group consisting of woven forms, knits, braids and combinations thereof.

The fibrous material can be continuous or discontinuous in form. Depending on the end-use application of the composite structure and the required mechanical properties, more than one fibrous materials can be used, either by using several same fibrous materials or a combination of different fibrous materials, i.e. the composite structure according to the present invention may comprise one or more fibrous materials. An example of a combination of different fibrous materials is a combination comprising a non-woven structure such as for example a planar random mat which is placed as a central layer and one or more woven continuous fibrous materials that are placed as outside layers. Such a combination allows an improvement of the processing and thereof of the homogeneity of the composite structure thus leading to improved mechanical properties.

The fibrous material may be made of any suitable material or a mixture of materials provided that the material or the mixture of materials withstand the processing conditions used during impregnation by the matrix resin composition and the surface resin composition.

Preferably, the fibrous material comprises glass fibers, carbon fibers, aramid fibers, graphite fibers, metal fibers, ceramic fibers, natural fibers or mixtures thereof; more preferably, the fibrous material comprises glass fibers, carbon fibers, aramid fibers, natural fibers or mixtures thereof; and still more preferably, the fibrous material comprises glass fibers, carbon fibers and aramid fibers or mixtures thereof.

The fibrous material is preferably impregnated with the matrix resin by thermopressing.

During thermopressing, the fibrous material, the matrix resin composition and the surface resin composition undergo heat and pressure in order to allow the resin compositions to melt and penetrate through the fibrous material and, therefore, to impregnate said fibrous material.

Typically, thermopressing is made at a pressure between 2 and 100 bars and more preferably between 10 and 40 bars and a temperature which is above the melting point of the matrix resin composition and the surface resin composition, preferably at least about 20° C. above the melting point to enable a proper impregnation. Heating may be done by a variety of means, including contact heating, radiant gas heating, infra-red heating, convection or forced convection air heating, induction heating, microwave heating or combinations thereof.

The impregnation pressure can be applied by a static process or by a continuous process (also known as dynamic process), a continuous process being preferred for reasons of speed. Examples of impregnation processes include without limitation vacuum molding, in-mold coating, cross-die extrusion, pultrusion, wire coating type processes, lamination, stamping, diaphragm forming or press-molding, lamination being preferred. During lamination, heat and pressure are applied to the fibrous material, the matrix resin composition and the surface resin composition through opposing pressured rollers or belts in a heating zone, preferably followed by the continued application of pressure in a cooling zone to finalize consolidation and cool the impregnated fibrous material by pressurized means. Examples of lamination techniques include without limitation calendering, flatbed lamination and double-belt press lamination. When lamination is used as the impregnating process, preferably a double-belt press is used for lamination.

The matrix resin composition and the surface resin composition are applied to the fibrous material by conventional means such as for example powder coating, film lamination, extrusion coating or a combination of two or more thereof, provided that the surface resin composition is applied on at least a portion of the surface of the composite structure, which surface is exposed to the environment of the composite structure.

During a powder coating process, a polymer powder which has been obtained by conventional grinding methods is applied to the fibrous material. The powder may be applied onto the fibrous material by scattering, sprinkling, spraying, thermal or flame spraying, or fluidized bed coating methods. Optionally, the powder coating process may further comprise a step which consists in a post sintering step of the powder on the fibrous material. The matrix resin composition and the surface resin composition are applied to the fibrous material such that at least a portion of the surface of the composite structure is made of the surface resin composition. Subsequently, thermopressing is performed on the powder coated fibrous material, with an optional preheating of the powder coated fibrous material outside of the pressurized zone.

During film lamination, one or more films made of the matrix resin composition and one or more films made of the surface resin composition which have been obtained by conventional extrusion methods known in the art such as for example blow film extrusion, cast film extrusion and cast sheet extrusion are applied to the fibrous material, e.g. by layering. Subsequently, thermopressing is performed on the assembly comprising the one or more films made of the matrix resin composition and the one or more films made of the surface resin composition and the one or more fibrous materials. In the resulting composite structure, the films melt and penetrate around the fibrous material as a polymer continuum surrounding the fibrous material. During extrusion coating, pellets and/or granulates made of the matrix resin composition and pellets and/or granulates made of the surface resin composition are melted and extruded through one or more flat dies so as to form one or more melt curtains which are then applied onto the fibrous material by laying down the one or more melt curtains. Subsequently, thermopressing is performed on the assembly comprising the matrix resin composition, the surface resin composition and the one or more fibrous materials.

The composite structure comprised in the material forming the hollow body of the muffler or silencer and obtainable according to the above described process may be shaped into a desired geometry or configuration, or used in sheet form. Preferably, the composite structure is used in sheet form when used in a process for producing a material for forming the hollow body of the muffler or silencer, which material comprises a fibre lining and a composite structure.

The material forming the hollow body of the muffler or silencer may be obtained in a lamination process, in which heat and pressure are applied to the fibre lining and the composite structure in order to allow the fibre lining to partially penetrate the composite structure. Examples of lamination techniques include without limitation calendaring, flatbed lamination and double-belt press lamination.

The lamination process for producing the material forming the hollow body of the muffler or silencer comprises the steps of a) superposing and contacting a fibre lining and a composite structure comprising a surface having at least a portion thereof made of a surface resin composition and a core comprising a fibrous material impregnated with a matrix resin composition to form a stack, b) heating the stack to a temperature above the melting point of the matrix resin composition and the surface resin composition, c) applying a pressure of from 2 to 100 bars to the stack while maintaining the temperature above the melting point of the matrix resin composition and the surface resin composition, d) cooling the stack to a temperature below the melting point of the matrix resin composition and the surface resin composition while maintaining the applied pressure, and e) releasing the applied pressure.

In the lamination process to form the material forming the hollow body of the muffler or silencer, the heat applied in step b) allows the surface resin composition and preferably also the matrix resin composition to melt and at least partially wet and penetrate up to a certain degree the face of the fibre lining contacting the composite structure. The surface resin composition and matrix resin composition are heated to a temperature that is above the melting point of the matrix resin composition and the surface resin composition, preferably at least about 20° C. above the melting point to enable a proper partial penetration.

In the lamination process to form the material forming the hollow body of the muffler or silencer, the pressure applied in step c) allows the fibre lining to partially sink and penetrate into the molten surface resin composition and preferably also the surface matrix composition. The applied pressure may range of from 2 to 100 bars and more preferably of from 10 to 40 bars.

In the lamination process to form the material forming the hollow body of the muffler or silencer, the cooling of step d) allows the stack to cool to a temperature below the melting point of the matrix resin composition and the surface resin composition. Maintaining the applied pressure allows the fibre lining to be solidly anchored in the surface resin composition and matrix resin composition before carrying on with the process The lamination process to form the material forming the hollow body of the muffler or silencer may be performed through opposing pressured rollers or belts in a heating zone, preferably followed by the continued application of pressure in a cooling zone to finalize the process and cool the impregnated fibrous material by pressurized means.

The fibre lining comprised in the material forming the hollow body of the muffler or silencer may further comprise a surface coating composition comprising a particulate material.

The surface coating composition may comprise a particulate material such as silica particles, ceramic particles, metal particles, alumina particles, titanium dioxide particles, zirconia particles, carbide particles, boride particles, or mixtures thereof. Preferably, the surface coating composition comprises carbide particles such as for example silicon carbide particles, boron carbide particles, nitride particles, and mixtures thereof.

The coating composition may be applied to the fibre lining in the form of an aqueous solution or suspension by methods known in the art such as for example kiss roll coating, spray coating, dipping, knife coating, or doctor blade coating.

The particulate material comprised in the surface coating composition may have a size distribution where 95% of the particles are between 0.1 to 50 microns. The preferred carbide particles, particularly silicon and boron carbide particles, may have a size distribution where 95% of the particles are between 0.1 to 10 microns.

The surface coating composition may be present on the fibre lining in amounts of from 0.1 to 10 grams per square meter, more preferably of from 1 to 5 grams per square meter.

The coating composition may be applied to the fibre lining before or after the lamination process for producing the material forming the hollow body of the muffler or silencer. The coating composition is preferably applied to the surface of the fibre lining that faces the interior of the muffler.

The present invention further provides for a process for producing a muffler or silencer, comprising the steps of a) forming a material comprising a fiber lining and a composite structure, said fiber lining partially penetrating the composite structure, into a hollow body having an inlet opening and an outlet opening, b) connecting an inlet pipe extending into the hollow body through the inlet opening to the hollow body, and c) connecting an outlet pipe extending out of the hollow body through the outlet opening to the hollow body.

The material forming the hollow body of the muffler or silencer may be formed into an appropriate shape by compression molding, stamping, or any technique using heat and/or pressure. Preferably, pressure is applied by using a hydraulic molding press. During compression molding or stamping, the material is preheated to a temperature above the melting point of the matrix resin composition and the surface resin composition and is transferred to a forming or shaping means such as a molding press containing a mold having a cavity of the shape of the final desired geometry whereby it is shaped into a desired configuration and is thereafter removed from the press or the mold after cooling to a temperature below the melting point of the surface resin composition and preferably below the melt temperature the matrix resin composition. For example, the material can be formed into two halves that are then joined to form the cavity by vibration welding, laser welding or by rivets, screws or bolts.

Alternatively, the material forming the hollow body of the muffler or silencer may be formed into an essentially tubular, such as for example cylindrical, hollow body. The hollow body may be formed by rolling a sheet of preferably pre-cut material into a tubular shape and welding together the edges of the sheet to form the hollow body of the muffler. Suitable welding techniques are vibration welding, hot air welding, sonic welding, laser welding, and frictional welding.

What is claimed is:

1. A muffler for internal combustion engines comprising:
   (a) a hollow body having an inlet opening and an outlet opening,
   (b) an inlet pipe extending into the hollow body through the inlet opening
   (c) an outlet pipe extending out of the hollow body through the outlet opening,
   wherein the hollow body is formed by a material comprising a fiber lining and a composite structure, and wherein from 0.5 to 50 percent of the fiber lining penetrates the composite structure, based on the thickness of the fiber lining, and wherein the composite structure comprises
   (iv) a surface having at least a portion thereof made of a surface resin composition; and
   (v) a core comprising a fibrous material impregnated with a matrix resin composition,
   wherein the surface resin composition and the matrix resin composition are polyamide compositions comprising one or more polyamide resins.

2. The muffler according to claim 1, wherein the fiber lining is a non-woven structure.

3. The muffler according to claim 1, wherein the fiber lining is a reinforced non-woven structure.

4. The muffler according to claim 1, wherein the fiber lining comprises a surface coating composition comprising a particulate material.

5. The muffler according to claim 1, wherein the fiber lining comprises a fibrous material chosen from mineral fibers.

6. A muffler for internal combustion engines comprising:
   (a) a hollow body having an inlet opening and an outlet opening,
   (b) an inlet pipe extending into the hollow body through the inlet opening
   (c) an outlet pipe extending out of the hollow body through the outlet opening,
   wherein the hollow body is formed by a material comprising a fiber lining and a composite structure, and wherein from 0.5 to 50 percent of the fiber lining penetrates the composite structure, based on the thickness of the fiber lining, wherein the fiber lining is fixed to the composite structure using a heat-resistant yarn.

7. The muffler according to claim 1, wherein the muffler further comprises a tubular element having lateral perforations, said tubular element connecting the inlet pipe and outlet pipe.

8. A process for producing a muffler or silencer, comprising the steps of:
   (a) forming a hollow body having an inlet opening and an outlet opening, the hollow body comprising a fiber lining and a composite structure, wherein from 0.5 to 50 percent of the fiber lining penetrates the composite structure based on the overall thickness of the fiber lining, and wherein the composite structure comprises
      (i) a surface having at least a portion thereof made of a surface resin composition; and
      (ii) a core comprising a fibrous material impregnated with a matrix resin composition,
      wherein the surface resin composition and the matrix resin composition are polyamide compositions comprising one or more polyamide resins,
   (b) connecting an inlet pipe extending into the hollow body through the inlet opening to the hollow body, and
   (c) connecting an outlet pipe extending out of the hollow body through the outlet opening to the hollow body.

9. The muffler according to claim 1, wherein from 0.5 to 25 percent of the fiber lining penetrates the composite structure, based on the thickness of the fiber lining.

10. The muffler according to claim 1, wherein from 1 to 15 percent of the fiber lining penetrates the composite structure, based on the overall thickness of the fiber lining.

11. The muffler according to claim 1, wherein from 1 to 5 percent of the fiber lining penetrates the composite structure, based on the thickness of the fiber lining.

12. The muffler according to claim 1, wherein the fiber lining has a thickness of from 3 to 90 millimeters.

13. The muffler according to claim 1, wherein the fiber lining has a thickness of from 5 to 50 millimeters.

14. The muffler according to claim 1, wherein the fiber lining has an area density of from 200 to 4000 grams per square meter.

15. The muffler according to claim 5, wherein the mineral fibers are selected from the group consisting of glass fibers, basalt fibers, asbestos fibers, graphite fibers, carbon fibers, ceramic fibers, and combinations thereof.

16. The muffler according to claim 15, wherein 0.5 to 25 percent of the fiber lining penetrates the composite structure, based on the thickness of the fiber lining.

17. The muffler according to claim 16, wherein the fiber lining has a thickness of from 3 to 90 millimeters.

18. The muffler according to claim 7, wherein:
- the mineral fibers are selected from the group consisting of glass fibers, basalt fibers, asbestos fibers, graphite fibers, carbon fibers, ceramic fibers, and combinations thereof;
- 0.5 to 25 percent of the fiber lining penetrates the composite structure, based on the thickness of the fiber lining;
- the fiber lining has a thickness of from 3 to 90 millimeters.

19. The muffler according to claim 6, wherein the muffler further comprises a tubular element having lateral perforations, said tubular element connecting the inlet pipe and outlet pipe.

\* \* \* \* \*